(No Model.) 2 Sheets—Sheet 1.

P. D. HARDY.
HAY RAKE.

No. 394,647. Patented Dec. 18, 1888.

Witnesses:
E. W. Stuart
John Memmer

Inventor.
Perry D. Hardy,
By Attorney
C. P. Humphrey (No Model.) 2 Sheets—Sheet 2.

P. D. HARDY.
HAY RAKE.

No. 394,647. Patented Dec. 18, 1888.

Witnesses
E. W. Stuart
John Memmer

Inventor
Perry D. Hardy
By his Attorney
C. P. Humphrey

UNITED STATES PATENT OFFICE.

PERRY D. HARDY, OF NORTHAMPTON, OHIO.

HAY-RAKE.

SPECIFICATION forming part of Letters Patent No. 394,647, dated December 18, 1888.

Application filed April 20, 1887. Serial No. 235,562. (No model.)

*To all whom it may concern:*

Be it known that I, PERRY D. HARDY, a citizen of the United States, and a resident of Northampton township, in the county of Summit and State of Ohio, have invented a new and useful Improvement in Horse Hay-Rakes, of which the following is a specification.

My invention has relation to improvements in that class of horse hay-rakes in which the rake-teeth mounted on a frame, hinged on an axle which turns forward with the wheels, are raised to dump their load by a ratchet-wheel mounted on said axle and a pawl attached to the frame and arranged to engage said wheel.

The invention consists in the construction and arrangement of parts hereinafter fully described, and then specifically pointed out in the claims, due reference being had to the accompanying drawings, forming a part of this specification.

Figure 1:
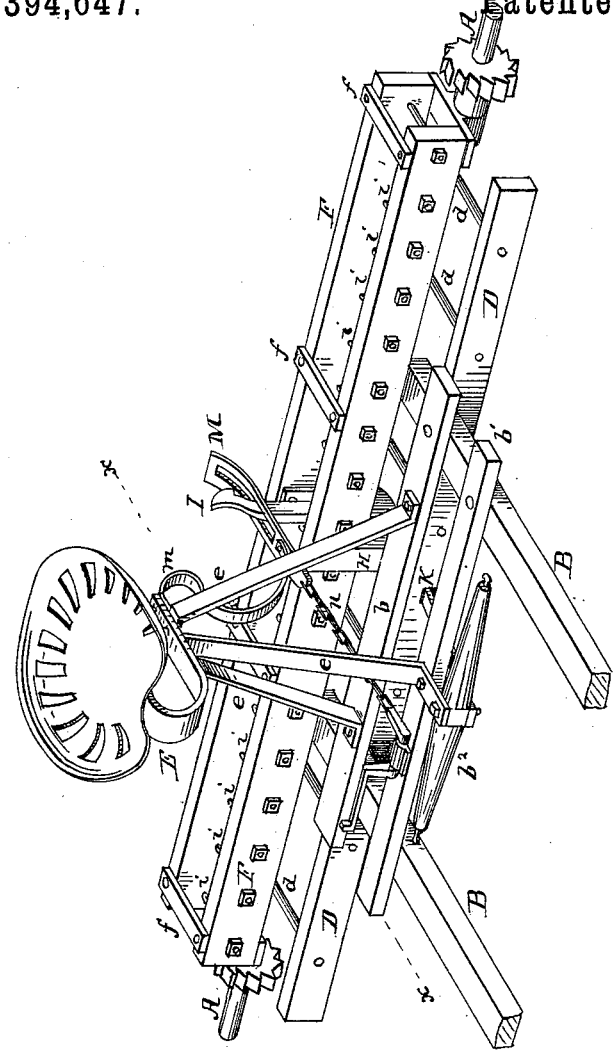
Figure 2:
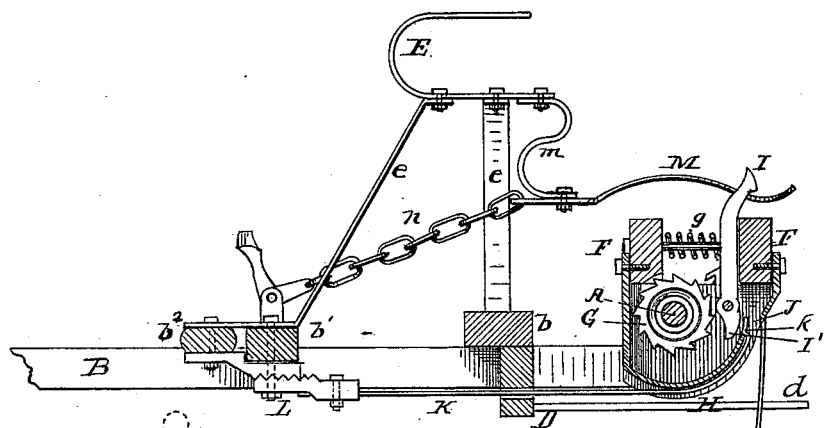

In the accompanying drawings, Figure 1 is a perspective view of my improved rake, the wheels, bumper, teeth, and reversing device being omitted to avoid confusion of lines; Fig. 2, a vertical central transverse section of Fig. 1 (enlarged) and unimportant parts omitted; and Fig. 3, a similar section at the line $x\,x$ of Fig. 1, showing the reversing device and bumper.

Figure 3:
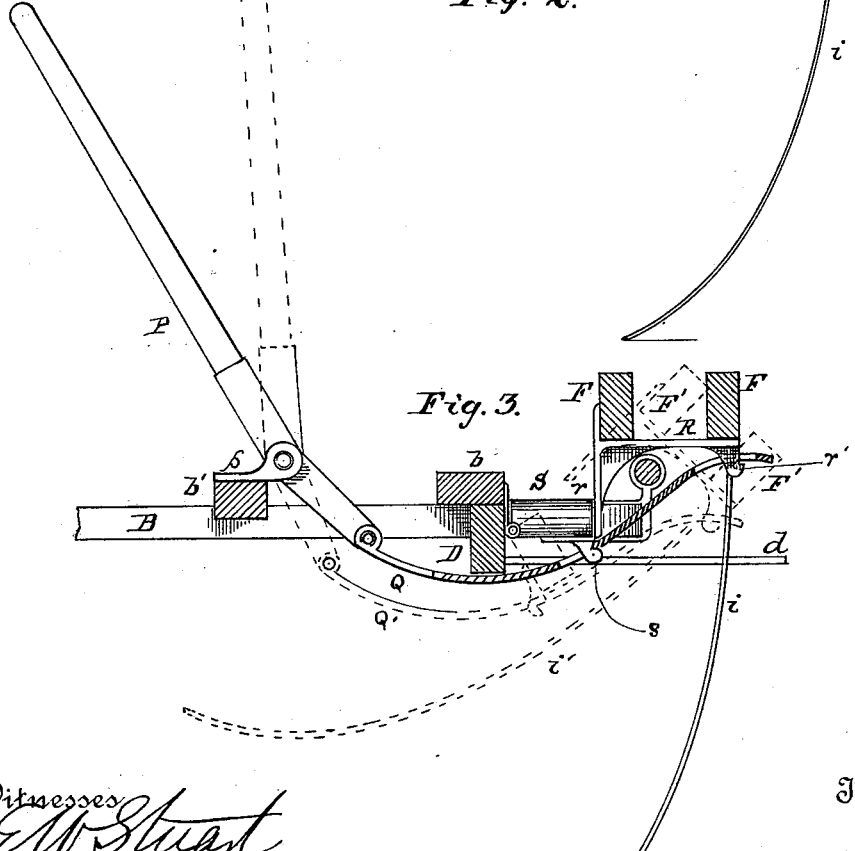

It will be understood that the devices illustrated in Figs. 2 and 3 form parts of the same machine, and I have shown them separately merely in order to more clearly illustrate the operation of the machine and to avoid confusion.

Similar letters of reference indicate like parts in the different drawings.

The axle A is a metallic rod, which, by ratchet-wheels or other suitable device, turns forward with the wheels. The thills B, hinged to the axle, are provided with three bars, $b$, $b'$, and D, the second of which supports the whiffletree and the latter the clearing-rods $d$.

The seat is mounted on a spring, E, supported on legs $e$, the front one of which projects beyond the bar $b'$, forming the upper support for the whiffletree.

The tooth-carrying frame F consists of two parallel bars united by suitable fastenings, $f$, mounted and arranged to rock on the axle A, the teeth $i$ depending from the rear bar.

On the center of the axle is a ratchet-wheel, G, inclosed in a case, H, open at the top and closed at the bottom, in which case a lever, I, is pivoted, which carries a pawl to engage the ratchet, and held out of contact by a spring, $g$. By causing the pawl to engage the ratchet the frame is swung forward and dumps the load, when the lever I encounters the bar $b$, releases the pawl, and permits the frame to swing back.

Thus far the construction and operation do not differ materially from rakes in use, except in the form and construction of the case H and lever I.

In my improved rake the sides of the case H extend beyond the bottom, making a semi-circular channel with an opening into the interior at the point J.

A flat spring, K, bent to conform to the shape of the channel, rests therein, and its upper end, $k$, bent inward nearly at a right angle and thence upward for a short distance, enters the opening J, engages the edge of the opening, and constitutes a latch, which prevents the frame swinging forward until released, but permits it to swing backward by sliding into the opening J.

The front end of the spring K is attached to the bar $b'$ by an adjustable clamp, L, consisting of two slotted plates with similarly-corrugated contiguous faces. The lower end, I', of the lever I extends below the pivot, and is arranged to engage and release the end $k$ of the spring at the same moment that the pawl engages the ratchet.

Attached to the spring E by a spring, $m$, is a slotted plate, M, resting over the lever I, so arranged that when at rest the upper end of said lever projects through said slot, and may swing backward or forward without encountering the ends of the slot. A chain, $n$, connects this plate with a treadle attached to the bar $b'$. By depressing the treadle the plate M is swung forward and the rear end of the slot engages the hook on the end of the lever I, throws the pawl into the ratchet, and simultaneously releases the spring-latch $k$, thereby causing the frame F to swing forward, as hereinbefore stated.

Near the end of the bar $b'$ is a bearing, $p$, in which is pivoted a lever, P, having a long and short arm, the former projecting upward and constituting a handle, and the lower hinged to a link, Q, hereinafter described. Opposite this lever, on the bottom of the frame F, is a cast plate, R, having a front projection, r, and a rear projecting hook, r'.

Hinged to the bar D, opposite the front projecting end, r, is an elastic bumper, S, of coiled spring, rubber, or other suitable material, against which the end r rests while raking, and which, when the frame swings back after the load is dumped, arrests its motion without shock to the machine.

The link Q consists of a strap of iron of sufficient weight to retain its shape when in use, having a slot in its outer end and bent, as shown, to avoid the intervening parts of the rake and bring the slotted end about the hook r' in the same manner as the slotted plate M surrounds the lever I, and as the one will be readily understood from the drawings of the other an elevation only is shown.

The slot extends so far back that the hook r' will not engage its back edge when the frame is swung forward to dump the load. To hold this link Q in position over the hook r', there is a similar but smaller hook, s, on the back end of the bumper S, which rests in a short slot in the link Q, and which practically makes a hinge therewith.

The weight of the long arm of the lever P constantly presses the link Q back, thereby swinging the bumper into a horizontal position, as shown, which in turn holds the slotted end of the link over the hook r'. By throwing the upper end of the lever P back the link Q is drawn forward, swinging the bumper S down out of the way of the end r, and by engaging the hook r' rocks the frame F backward, bringing the teeth i under the thill-frame, as shown by dotted lines, Fig. 3.

I do not desire it understood that I confine my invention to the exact mechanical construction herein shown and described; but the semicircular channel may be distinct from the ratchet-case, the spring K may be round, a bent rod may be used in place of the slotted plate M, a different form of treadle may be used, the ratchet-case may be arranged to strike the bumper instead of having a separate piece for that purpose, the bumper may swing otherwise than down, and, generally, other modifications clearly falling within the scope of my invention to adapt it to different forms of rakes of the class specified may be adopted.

The essential features of my invention which I claim are—

1. In a rake of the kind specified, the combination of the rocking tooth-frame provided with a pawl-lever adapted to engage a ratchet-wheel upon the axle, whereby the rake is dumped, the spring-supported plate M, having a slot within which the pawl-lever swings, a lever for operating said plate, a hook-catch secured to the rocking tooth-frame, the carriage, a lever attached to said carriage, and a slotted link connected with said lever and adapted to engage the hook-catch on the rocking tooth-frame and swing the same backward, substantially as shown and described.

2. In a rake of the kind specified, the combination of the rocking tooth-frame provided with a pawl-lever adapted to engage a ratchet-wheel upon the axle, whereby the rake is dumped, the spring-supported plate M, having a slot within which the pawl-lever swings, a lever for operating said plate, the carriage, a hinged bumper interposed between said frame and carriage, and a slotted link adapted to engage both the hinged bumper and the rocking tooth-frame and connected with a lever, whereby the hinged bumper is swung down from between the carriage and the rocking tooth-frame and said frame simultaneously swung backward, substantially as shown and described.

In testimony that I claim the foregoing I have hereunto set my hand.

PERRY D. HARDY.

Witnesses:
  C. P. HUMPHREY,
  H. B. HARDY.